United States Patent Office 3,642,827
Patented Feb. 15, 1972

3,642,827
TETRACHLORINATED CHROMOGENIC
COMPOUNDS
Sheldon Farber and Arthur John Wright, Dayton, Ohio,
assignors to The National Cash Register Company,
Dayton, Ohio
No Drawing. Filed Nov. 3, 1970, Ser. No. 86,642
Int. Cl. C07d 5/34
U.S. Cl. 260—343.3                    2 Claims

ABSTRACT OF THE DISCLOSURE

A chromogenic material of normally colorless form is disclosed having the structural formula:

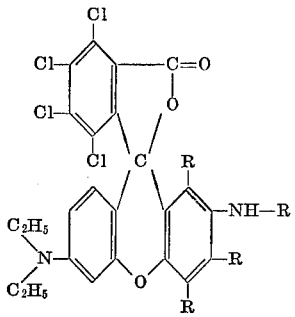

wherein R is hydrogen, an alkyl radical having 1 to 4 carbon atoms per R group or chlorine and $R^1$ is hydrogen, an alkyl radical having 1 to 4 carbon atoms per $R^1$ group or phenyl.

---

This invention relates to colorless, but colorable fluoran dyes for use in pressure sensitive record material. More specifically, this invention relates to tetrahalo-fluoran dyes.

Throughout this application, it is to be understood that the fluoran dyes are substantially colorless until reacted with an acidic material.

Heretofore, some of the pressure sensitive, mark-forming systems of the prior art employed fluoran dyes which are substantially colorless in form when in liquid solution, but which are connected to colored forms upon reactive contact with acidic material. Often, there are problems with the intensity and hue of these colored forms. For example, color instability on exposure to light frequently occurs.

Colorless, but colorable tetrahalo-fluoran dyes now have been found. The tetrahalo-fluoran dyes of this invention have improved lightfastness qualities, i.e., improved fade resistance.

Pressure sensitive, mark-forming systems of the prior art include a marking system of disposing on or within sheet support material, mutually reactant but unreacted mark-forming components and a liquid solvent in which each of the mark-forming components is soluble. The liquid solvent is present in such form that it is maintained isolated by a pressure rupturable barrier from at least one of the mark-forming components until an application of pressure causes a breach or rupture of the barrier in the area delineated by the pressure pattern. The mark-forming components thereby are brought into reactive contact, producing a distinctive mark.

The tetrahalo-fluoran dyes of this invention having chromogenic properties can be incorporated in a web or coated onto the surface of a web to provide a manifolding unit, which is useful in carrying out methods of marking involving reactive contact with color activating material to yield colored reaction products in areas where marking is desired.

The colorless, but colorable tetrahalo-fluorans of this invention are represented by the formula:

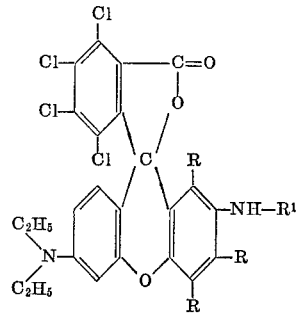

wherein R is hydrogen, an alkyl radical having 1 to 4 carbon atoms per R group or chlorine and $R^1$ is hydrogen, an alkyl radical having 1 to 4 carbon atoms per $R^1$ group or phenyl.

Specific examples are where:

| | R | $R_1$ | R | R |
|---|---|---|---|---|
| 1 | H | $CH_3$ | H | H |
| 2 | H | H | H | H |
| 3 | $CH_3$ | H | $CH_3$ | H |
| 4 | H | —C$_6$H$_5$— | H | H |
| 5 | $CH_3$ | H | H | $CH_3$ |

The tetrahalo-fluorans of this invention can be produced by any method known in the prior art. Generally, tetrachloro-phthalic anhydride is reacted with a diethylamino phenol to give tetrachloro-benzoic acid. This is then reacted with a phenol or naphthalene in the presence of sulfuric acid to yield the desired fluoran. Prior art processes are described in U.S. Pat. 3,501,331 and Beilsteins Handbuch der Organischem Chemie, copyright 1934 by Julius Springer in Berlin, volume XIX, pages 348–349.

A composition of matter is disclosed which comprises a colored product of chemical reaction having a resonant chemical structure and produced by contact of a color-activating material with one of the above-mentioned chromogenic compounds. The color-developing or activating material is an acidic substance useful for converting the chromogenic compounds to colored forms.

The method of marking of this invention, i.e., the method of developing a colored material from substantially colorless or slightly colored chromogenic compounds, comprises providing a chromogenic compound selected from among the above-mentioned compounds and bringing such chromogenic compound into reactive contact with an acidic color-activating substance, in areas where marking is desired, to produce a colored form of the chromogenic compound by the action thereupon of the acidic substance.

Acidic materials employed in this invention can be any compound within the definition of a Lewis acid, i.e., any electron acceptor. Preferably acidic organic polymers such as phenolic polymers are employed as the acidic material. The novel chromogenic materials exhibit the advantage of improved color stability when they are reacted with such phenolic polymers. Solution formation of solid particles of the polymeric material in a solvent system with the substantially colorless chromogenic compounds permits penetration of the colored reaction product into a porous support sheet, e.g., paper, so that the colored form of the chromogenic material is absorbed into the body of the sheet and is not merely on the surface of the sheet. The absorption feature provides protection against erasure of recorded data by attrition of the surface of a record sheet.

In a two-sheet unit, the bottom surface of the overlaying sheet is supplied on the surface or near the surface with a multiplicity of minute pressure-rupturable microcapsules containing a solution of the substantially colorless, chromogenic component. An acidic component, such as an acid clay or phenolic polymeric material lies within the lower web or undersheet or upon the upper surface of the lower web or undersheet. A colored mark is made by the use of a stylus, a type character, or other pressure-exerting means applied to the two-sheet unit manifold.

The encapsulated solution is released on the event of rupture of the capsules in writing operations. The released solution is transferred form the overlying or base-sheet to the receiving surface of the underlying sheet in conformance with the pressure pattern of the writing operation. The top of the underlying sheet is coated or impregnated with a material reactant with the chromogenic material, e.g., an acid clay or an acidic phenolic polymer material; and capsules are present on the overlying or base-sheet which capsules contain a liquid solution of chromogenic material. In another embodiment of the record material, the capsules can contain the polymeric phenolic material in liquid solution and the receiving surface of the underlying sheet can be supplied with the chromogenic material.

It is possible to incorporate the chromogenic material in a solid, crystalline state in a binder material so that the chromogenic material can be transferred from the overlying sheet, upon the application of pressure, to deposit some of the chromogenic material on the receiving surface of the undersheet, which receiving surface carries a color-activating polymeric material. Preferably, the chromogenic substance is dissolved in an appropriate solvent and minute droplets of the solution of the chromogenic material are encapsulated in minute, rupturable, capsules. It is apparent that many other arrangements are possible, including different configurations and relationships of the solvent and all of the mark-forming materials with respect to their encapsulation and location on the supporting underlying or overlying sheets or webs can be envisioned. Such arrangements are thoroughly described in application for Letters Patent No. 392,404, filed Aug. 27, 1964, in the names of Robert E. Miller and Paul S. Phillips, Jr., now abandoned.

The polymeric mark-forming components have a common solubility with the novel chromogenic material in at least one liquid solvent when the acid-reacting material is a phenolic or other acidic organic polymer. In a single system, several chromogenic materials can be used with the same or different polymeric materials. Several polymeric materials can be reactively contacted with a single chromogenic compound or with a mixture of chromogenic compounds.

The solvent can be maintained in physical isolation in minute droplets until such time as it released by application of pressure. This may be accomplished by several known techniques, but, preferably, isolation is maintained by encapsulation of individual droplets of the solvent in a microcapsule according to the procedures described, for example, in U.S. Pat. No. 2,712,507, issued July 5, 1955 on the application of Barrett K. Green; 2,730,457, issued Jan. 10, 1956 on the application of Barrett K. Green and Lowell Schleicher; 2,800,457, issued July 23, 1957 on the application of Barrett K. Green and Lowell Schleicher; 2,800,458, issued July 23, 1957 on the application of Barrett K. Green, re-issued as Re. Pat. No. 24,899 on Nov. 29, 1960; and 3,041,289, issued June 26, 1962 on the application of Bernard Katchen and Robert E. Miller. The microscopic capsules, when disposed within or upon a supporting web as a multiplicity in contiguous juxtaposition, are rupturable by pressure, such as normal marking pressure found, for example, in writing or typing operations.

The material or materials chosen as the wall material for the droplet-containing microcapsules. In addition to being pressure rupturable, are inert or unreactive with respect to the intended contents of the capsules and the other-mark forming components so that the capsule wall material remains intact under normal storage conditions until such time as it is released by an application of marking pressure. Preferred examples of eligible capsule wall materials include gelatin, gum arabic and many others thoroughly described in the forementioned patents.

For most uses in record material, the capsule size does exceed about 50 microns in diameter. Preferably, the capsules are smaller than about 15 microns in diameter.

The acidic organic polymeric material useful for developing the color of novel chromogenic compounds in this invention include phenolic polymers, phenol acetylene polymers, maleic acid-rosin resins, partially or wholly hydrolyzed styrene-maleic anhydride copolymers and ethylene-maleic anhydride copolymers, carboxy polymethylene and wholly or partially hydrolyzed vinylmethylether-maleic anhydride copolymer and mixtures thereof.

More specifically, phenol polymers found useful include alkyl-phenol acetylene resins, which are soluble in common organic solvents and possess permanent fusibility in the absence of being treated by cross-linking materials. Another specific group of useful phenolic polymers are members of the type commonly referred to as "novolacs," (a type of phenol-formaldehyde polymeric material) which are characterized by solubility in common organic solvents and which are, in the absence of cross-linking agents, permanently fusible. Resol resins, if they are still soluble, can be used, though they are subject to change in properties upon aging. Generally, phenolic polymer material found useful in practicing this invention is characterized by the pressure of hydroxyl groups and by the absence of groups such a methylol, which tend to promote infusibility or cross-linking of the polymer, and, further, by being soluble in organic solvents and relatively insoluble in aqueous media. Mixtures of these organic polymers and other acidic materials can be employed.

A laboratory method useful in the selection of suitable phenolic resins is the determination of the infrared absorption pattern. It has been found that phenolic resins which undergo absorption in the 3200–3500 cm.$^{-1}$ region (which is indicative of hydroxyl groups) on the resin molecules and which do not absorb in the 1600–1700 cm.$^{-1}$ region are eligible. This latter absorption region is indicative of desensitization of hydroxyl groups which desensitization renders such groups unavailable for reaction with the chromogenic materials.

The preparation of some organic polymeric materials useful for practicing this invention has been described in "Industrial and Engineering Chemistry," volume 43, pages 134 to 141, January 1951, and a particular polymer thereof is described in Example I of U.S. Pat. No. 2,052,093, issued to Herbert Hönel on Aug. 25, 1936. The preparation of the phenol-acetylene polymers has been described in "Industrial and Engineering Chemistry," volume 41, pages 73 to 77, January 1949. The preparation of maleic anhydride copolymers is described in the literature, such as, for example, one of the maleic anhydride vinyl copolymers, as disclosed in "Vinyl and Related Polymers," by Calvin E. Schildknecht, second printing, published April 1959, by John Wiley & Sons, Incorporated: See pages 65 to 68 (styrene-maleic anhydride copolymer), 530 to 531 (ethylene-maleic anhydride copolymer), and 628 to 630 (vinylmethylether-maleic anhydride copolymer).

When the acidic material used as a mark-forming component in the present invention is one of the aforementioned organic polymers, the liquid solvent is chosen so as to be capable of dissolving it. The solvent can be volatile or nonvolatile, and a single- or multiple-component solvent can be used which is wholly or partially volatile. Examples of volatile solvents useful in practicing the present invention include toluene, petroleum distillate, perchloroethylene, and xylene. Examples of nonvolatile solvents include high-boiling-point petroleum fractions and chlorinated biphenyls. Generally, the solvent chosen is capable of dissolving at least about 0.3 percent, by weight, of the chromogenic material, and at least about 3 to 5 percent, by weight, of the acidic polymeric material. However, in the preferred system, the solvent is capable of dissolving an excess of the polymeric material.

Further, the solvent does not interfere with the mark-forming reaction. In some instances, the presence of the solvent has been found to interfere with the mark-forming reaction or diminish the intensity of the mark. In these instances the solvent chosen should be sufficiently volatile to assure its removal from the reaction site soon after having brought the mark-forming components into reactive contact so that the mark-forming reaction can proceed.

Since the mark-forming reaction requires that an intimate mixture of the components be brought about through solution of said components, one or more of the mark-forming components can be dissolved in solvent droplets isolated by encapsulation, the only requirement being that at least one of the components essential to the mark-forming reaction be maintained isolated until the mark-forming reaction is desired.

In the usual case, the mark-forming components are so chosen as to produce a mark upon application of pressure to a coated system of sheets at room temperature (20 to 25 degrees centigrade). However, the present invention also includes a system wherein the solvent component is not liquid at temperatures near room temperature but is liquid and in condition for forming solutions only at elevated temperatures.

The support sheet member on which components of the system are disposed can comprise a single or a dual sheet assembly. In the case where all components are disposed on a single sheet, the record material is referred to as a "self-contained" or autogenous system. Where there is a migration of solvent, with or without the mark-forming component, from one sheet to another, the record material is referred to as a "transfer" system. (Such a system may also be referred to as a "two-fold" system, in that at least two sheets are required and each sheet includes a component, or components, essential to the mark-forming reaction.) Where an adequate amount of the colored reaction product is produced in liquid or dissolved form on a surface of one sheet, a colored mark can be recorded on a second sheet by transfer of the colored reaction product.

In a preferred case, where microcapsules are employed, they can be present in the sheet support material either disposed therethroughout or as a coating thereon, or both. The capsules can be applied to the sheet material as a dispersion in the liquid vehicle in which they were manufactured, or, if desired, they can be separated from the vehicle and thereafter dispersed in a solution of the acid-reacting polymeric component (for instance, 30 grams of water and 53 grams of a 1 percent, by weight, aqueous solution of polyvinylmethylether-maleic anhydride) to form a sheet-coating composition in which, because of the inertness of the solution and the capsules, both components retain their identity and physical integrity. When this composition is disposed as a film on the support material and dried, the capsules are held therein subject to release of the contained liquid by rupture of the capsule walls. The latter technique, relying on the inertness of the microcapsule and the dispersing medium of the film-forming mark-forming polymeric component, provides a method for preparing a sensitive record material coating having the capsules interspersed directly in a dry film of the polymeric material as the film is laid down from solution. A further alternative is to disperse one or more mark-forming components, and the chromogenic-material-containing microcapsules in a liquid medium not a solvent for either the mark-forming component or the microcapsules, with the result that all components of the mark-forming system can be disposed on or within the support sheet in the one operation. The several components can be applied individually. The capsules also can be coated onto a sheet as a dispersion in a solution of polymeric material which is not necessarily reactive with the capsule-contained solution of chromogenic materials.

The respective amounts of the several components can be varied according to the nature of the materials and the architecture of the record material unit desired or required. Suitable lower amounts include, in the case of the chromogenic material, about 0.005 to 0.075 pound per ream (a ream in this application meaning five hundred (500) sheets of 25" x 38" paper, totalling 3,300 square feet); in the case of the solvent about 1 to 3 pounds per ream; and in the case of the polymer, about 0.5 pound per ream. In all instances, the upper limit is primarily a matter of economic consideration.

The slurry of capsules can be applied to a "wet" web of paper, for example, as it exists on the screen of a Fourdrinier paper machine, so as to penetrate the paper web a distance depending on the freeness of the pulp and the water content of the web at the point of application. The capsules can be placed directly in or on a paper or support sheet. Not only capsule structures, but continuous films which contain a multitude of microscopic, unencapsulated, droplets for local release in an area subjected to pressure can be utilized. (See, for example, U.S. Pat. No. 2,299,694 which issued Oct. 20, 1942, on the application of Barrett K. Green.)

With respect to the acidic organic polymeric component, a solution thereof in an evaporable solvent can be introduced into an amount of water and the resulting mixture can be agitated while the evaporable solvent is blown off by an air blast. This operation leaves an aqueous colloidal dispersion slurry of the polymeric material, which can be applied to finished paper so as to leave a surface residue or the slurry can be applied to a "wet" web of paper or at the size-press station of a paper making machine. In another method for making a polymer-sensitized sheet, the water-in-soluble polymer can be ground to a desired or required particle size in a ball mill with water, preferably with a dispersing agent, such as a small quantity of sodium silicate. If a binder material of hydrophilic properties is ground with the polymeric material, the binder itself can act as a dispersant. If desired, an amount of binder material of up to 40 percent, by weight, of the amount of polymeric material can be added to the ball-milled slurry of materials—such binder materials being of the paper coating binder class, including, for example, gum arabic, casein, hydroxyethyl-cellulose, and latexes (such as styrene-butadiene copolymer). If desired, oil absorbents in the form of fuller's earths can be combined with the polymeric material particles to assist in retaining, in situ, the liquid droplets of chromogenic material solution to be transferred to it in data-representing configuration, for the purpose of preventing "bleeding" of the print.

Another method for applying the chromogenic or polymeric material individually to a single sheet of paper is by immersing a sheet of paper in 1–10 percent, by weight, solution of the material in an evaporable solvent. This operation is conducted individually for each reactant, because if the other reactant material is present, contact of the reactants results in a premature coloration over the sheet area. A dried sheet with one component then can be coated with a solution of another component, the solvent of which is a non-solvent to the already-supplied component.

The polymeric material can also be dissolved in ink composition vehicles to form a printing "ink" of colorless character can be used to spot-print a proposed record-sheet-unit sensitized for recording, in a reaction-produced color in those spot-printed areas, by application of a solution of the chromogenic material. In the case of phenolic polymer, a printing ink can be made of up to 75 percent, by weight, of the phenolic polymeric material in a petroleum-based solvent—the ink being built to a viscosity suitable for printing purposes. The relative amounts of reactive, mark-forming, components to be used in practice of this invention, are those most convenient and economical amounts consistent with adequate, desired or required visibility of the recorded data. The resolution of the recorded data is dependent on, among other things, particle or capsule size, distribution and amount of particles or capsules, liquid solvent migration, chemical reaction efficiency, and other factors, all of which can be optimized empirically by one skilled in the art.

In the color system of this invention the acidic mark-forming material reacts with the chromogenic material to effect distinctive color formation or color change. In a multi-sheet system in which an acidic organic polymer is employed, other materials to supplement the polymer reactants can be included. For example, kaolin can be added to improve the transfer of the liquid and/or the dissolved materials between the sheets. In addition, other materials such as bentonite, attapulgite, talc, feldspar, halloysite, magnesium trisilicate, silica gel, pyrophyllite, zinc sulfate, calcium sulfate, calcium citrate, calcium phosphate, calcium fluoride, barium sulfate and tannic acid can be included.

Various methods known to the prior art and others disclosed in the aforementioned application S.N. 392,404 in the names of Miller et al., now abandoned, and in U.S. patent application S.N. 420,193 in the names of Phillips et al., now U.S. Pat. 3,455,721, can be employed in compositions useful for coating mark-forming materials into supporting sheets. An example of the compositions which can be coated onto the receiving surface of an underlying sheet of a multi-sheet to react with a capsule coating on the underside of an overlying sheet is as follows:

| Coating composition: | Percent by weight |
|---|---|
| Phenolic polymer mixture | 17 |
| Paper coating kaolin (white) | 57 |
| Calcium carbonate | 12 |
| Styrene butadiene latex | 4 |
| Ethylated starch | 8 |
| Gum arabic | 2 |
| | 100 |

Having disclosed, generally, the chromogenic materials of this invention and preferred methods for utilizing the chromogenic materials, in combination with other materials, as reactive components in mark-forming record material; examples now are disclosed further illustrating the chromogenic materials.

EXAMPLE 1

The synthesis of

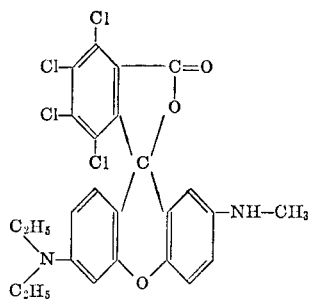

was carried out by admixing 9.02 grams of

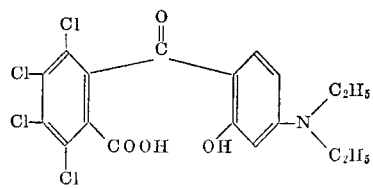

and 7.2 grams

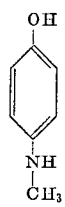

in 30 ml. of concentrated sulfuric acid and heating at 100° C. for 45 minutes. Heating was continued at 130° C. for an additional 3 hours. The mixture then was cooled and poured into 500 grams of ice. The pH of the mixture was adjusted to a pH of 10 to 11 by the addition of 50 percent sodium hydroxide. The mixture then was extracted with three 100 ml. portions of benzene. After two 100 ml. washings with 10 percent sodium hydroxide, the mixture was washed with water until neutral. After evaporation to a low volume, crystallization was carried out from petroleum ether. Recrystallization from benzene ether resulted in a yield of 5 weight percent. The product exhibited a green-neutral color on clay and had a melting point of 239–240° C.

Analysis was as follows: Calculated (percent): C, 55.78; H, 3.75; N, 5.20; Cl, 26.34. Found (percent): C, 55.90; H, 3.80; N, 5.09; Cl, 26.45.

EXAMPLE II

The synthesis of

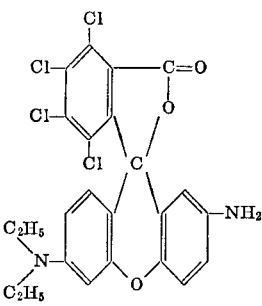

was carried out by reacting 9.02 grams of

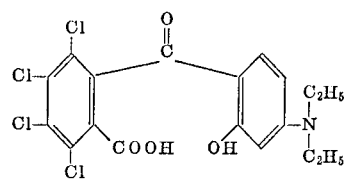

and 3.02 grams of

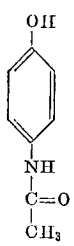

under the same conditions and according to the procedure described in Example I. The resulting product exhibited a green-purple color on clay and had a melting point of 194–195° C.

Analysis was as follows: Calculated (percent): C, 54.96; H, 3.46; N, 5.34; Cl, 27.05. Found (percent): C, 54.86; H, 3.20; N, 5.17; Cl, 26.94.

EXAMPLE III

The synthesis of

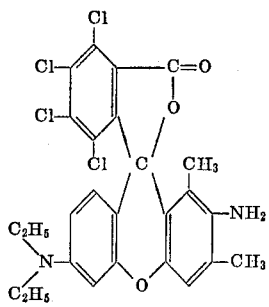

was carried out by reacting 9.02 grams of

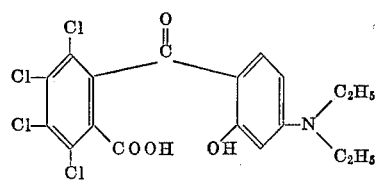

and 2.74 grams of

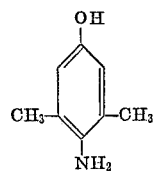

under the same conditions and according to the procedure described in Example I. The resulting product exhibited a green-neutral color on clay.

Analysis was as follows: Calculated (percent): C, 56.54; H, 4.02; N, 5.07; Cl, 25.68. Found (percent): C, 56.39; H, 3.73; N, 4.87; Cl. 25.80.

EXAMPLE IV

Various tetrachloronated and unchloronated fluorans were tested as follows. The reflectance spectra of fresh and faded samples were compared. A complete white, which is 100% reflectance, was assigned a value of 1.00. The various samples then were assigned values accordingly, which are called eye efficiency values. The relative eye efficiency values for the various samples were taken on kaolin phenol paper. The fade values are the comparison of eye efficiency values after 24 hours exposure to a daylight box. The results were as follows:

| Dye | Percent fade in eye values after 24 hours kaolin phenol |
|---|---|
| (dye structure 1) | 21 |
| (dye structure 2) | 7 |
| (dye structure 3) | 25 |
| (dye structure 4) | 0 |

The percent fade of the tetrachloronated dye on kaolin phenol paper demonstrates a substantial improvement over the percent fade of the unchloronated dye on kaolin phenol paper.

What is claimed is:

1. A chromogenic compound represented by the formula:

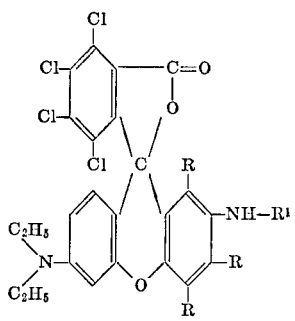

wherein R is hydrogen, an alkyl radical having 1 to 4 carbon atoms per R group or chlorine and $R^1$ is hydrogen, an alkyl radical having 1 to 4 carbon atoms per $R^1$ group or phenyl.

2. A compound according to claim 1 wherein each R is hydrogen or methyl and $R^1$ is hydrogen or phenyl.

References Cited

UNITED STATES PATENTS 3,501,331   3/1970   Kimura et al. _____ 260—343.3

ALEX MAZEL, Primary Examiner

A. M. T. TIGHE, Assistant Examiner

U.S. Cl. X.R.

117—36.8, 36.2